F. J. GLEASON.
ADHESIVE FABRIC.
APPLICATION FILED SEPT. 1, 1910.
997,125.
Patented July 4, 1911.
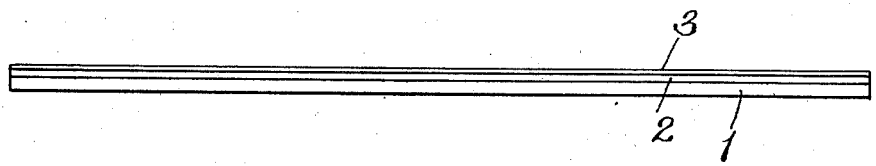

UNITED STATES PATENT OFFICE.

FREDERICK J. GLEASON, OF WALPOLE, MASSACHUSETTS, ASSIGNOR TO WALPOLE RUBBER COMPANY, OF WALPOLE, MASSACHUSETTS, A CORPORATION OF MAINE.

ADHESIVE FABRIC.

997,125.  Specification of Letters Patent.  Patented July 4, 1911.

Application filed September 1, 1910. Serial No. 580,067.

*To all whom it may concern:*

Be it known that I, FREDERICK J. GLEASON, of Walpole, in the county of Norfolk and State of Massachusetts, have invented certain new and useful Improvements in Adhesive Fabrics, of which the following is a specification.

This invention has relation to adhesive fabrics such as are employed in reinforcing a base of leather, leatherboard, composition or the like in the manufacture of inner soles.

The object of the invention is to provide a fabric of the character referred to having an adherent layer which, by the application of heat, may be caused to adhere properly to the materials referred to without being so softened as to sink into the fabric. To this end, I utilize as a base, canvas, or other suitable fabric, and apply thereto an inner layer of high melting point adhesive material, and an outer layer of adhesive material of a relatively lower melting point, which can be softened and rendered tacky by the application of heat without affecting the inner layer. By thus employing two layers as described, I am able to secure a stronger union between the fabric and the leather than has heretofore been possible.

On the accompanying drawing, I have illustrated conventionally an adhesive fabric embodying my invention and made in accordance with my process.

The base 1 consists, as previously stated, of cloth of any desired kind such, for instance, as canvas or duck, which I prefer to employ on account of its strength. Upon this cloth is spread by a suitable spreading machine, a molten layer 2 of adhesive material of relatively high melting point. This material consists preferably of the following ingredients, to wit: 20 parts (by weight) of gutta percha; and 20 parts of a pigment such as whiting, talc, or zinc oxid or their equivalents; two parts of a suitable pitch, tar or bitumen which will not injure gutta percha, such for instance as soft asphaltum, soft stearin pitch, pine tar, or Stockholm tar (preferably pine tar or Stockholm tar). The gutta percha and the tar are melted and thoroughly mixed, after which the pigment is stirred in. This mixture, on account of the presence of the pigment, has a melting point (*i. e.* at which it softens so as to drop) of approximately 380° F.

After the inner layer hardens or sets, the outer layer 3 is spread thereon while soft and plastic by a suitable spreading machine in one or more coats. Said outer layer consists of gutta percha 20 parts (by weight) and 2 parts of said tar, pitch or bitumen, preferably pine tar or Stockholm tar, melted and thoroughly commingled, and having a melting point (*i. e.* at which the mixture softens so as to drop) of approximately 238° F. As previously stated, the outer layer consists of one or more coats, preferably three, sufficient time elapsing between the application of the several coats to permit the preceding coat to set or partially set. The quantity in weight of material employed in the two layers is substantially the same, although the outer layer consists of three coats, owing to the fact that the specific gravity of the material of the inner layer is considerably greater than that of the outer layer. For instance, for a piece of cloth approximately 30 by 36 inches, the outer layer weighs about 2½ to 2¾ ounces, and the inner layer weighs about 2¼ ounces.

For guidance in carrying out the process, I may state that I preferably permit 12 hours to elapse after applying the inner layer before the outer layer is applied, and that approximately 3 or 4 hours should elapse between the successive coatings of the outer layer. Sometimes I find it desirable to add to the mixture of the inner layer while hot about 1 gallon of naphtha (72° Baumé), and to the mixture of the second layer about ½ gallon of said naphtha. The naphtha is heated and mixed while hot with said mixtures.

The fabric, made in accordance with the foregoing process, may be heated by a steam-heated plate, so as to soften the outer layer and make it tacky, without causing the softening of the inner layer. Thus there is no necessity of using steam or hot water for the purpose of rendering it flexible and pliable, and softening the facing, as fabric made in accordance with my invention retains its flexibility after the layers are applied thereto. The inner layer does not penetrate the cloth to any extent, and yet at the same time adheres most tenaciously thereto, and the softening of the outer layer permits a union between the cloth and the leather of great strength, while at the same time said outer layer is sufficiently hard so that it is normally not tacky and may be handled and shipped without the convolutions sticking together.

It will be understood that the exact proportions of the ingredients herein named may be changed in accordance with particular requirements. It will be noted that in the two layers, the gutta percha and the softening material, to wit, tar, pitch or bitumen, bear approximately the same proportion but that the melting point of the inner layer is increased as may be desired by the addition of the pigment. By increasing or decreasing the proportion of the pigment herein given, the melting point, that is the point at which the material will drop, will be raised or lowered as the case may be.

Having thus explained the nature of my said invention and described a way of making and using the same, although without attempting to set forth all of the forms in which it may be made or all of the modes of its use, what I claim is:

1. An adhesive fabric, consisting of a cloth, an inner adhesive layer having a relatively high melting point, and an outer normally non-tacky adhesive layer having a relatively low melting point.

2. An adhesive fabric, consisting of a cloth, an inner adhesive layer having a relatively high melting point, and an outer normally non-tacky adhesive layer having a relatively low melting point, each of said layers comprising gutta percha, and the inner layer also comprising a pigment.

3. An adhesive fabric, consisting of a cloth, an inner adhesive layer having a relatively high melting point, and an outer normally non-tacky adhesive layer having a relatively low melting point, each of said layers comprising gutta percha and pine tar or its described equivalent, and the inner layer also comprising a pigment.

4. An adhesive fabric consisting of a cloth having an adhering layer of adhesive normally non-tacky material, and a superimposed layer of normally non-tacky adhesive material having a lower melting point than the material of the first mentioned layer, so that it may be softened and rendered tacky by heat without materially softening the first mentioned material.

5. An adhesive fabric consisting of a cloth having on one face two superimposed adhering layers of normally non-tacky adhesive material capable of being made tacky by the application of heat, the inner layer also comprising a substance for raising its melting point, whereby the application of heat to the outer layer does not materially soften the inner layer.

6. The herein described process of making adhesive fabric, which consists in applying to said fabric a soft or plastic inner layer of adhesive material having a relatively high melting point, permitting the same to set, and subsequently superimposing on said inner layer an outer layer of normally non-tacky adhesive material having a relatively low melting point.

7. The herein described process of making adhesive fabrics, which consists in applying to a fabric a heated mixture comprising gutta percha and a material for raising the melting point of said mixture, permitting the layer thus formed to set, and then superimposing on said layer an outer layer comprising gutta percha, said outer layer having a lower melting point than said inner layer.

8. The herein described process of making adhesive fabrics, which consists in applying to a fabric a heated mixture comprising gutta percha, tar or its described equivalent and a pigment, permitting the layer thus formed to set, and then superimposing on said layer an outer layer of gutta percha and said tar or its described equivalent.

9. The herein described process of making adhesive fabrics, which consists in applying to a fabric a heated mixture comprising gutta percha, tar or its described equivalent and a pigment, permitting the layer thus formed to set, then superimposing on said layer a series of coats of said gutta percha and said tar or its described equivalent, permitting each coat to harden before the next coat is applied.

In testimony whereof I have affixed my signature, in presence of two witnesses.

FREDERICK J. GLEASON.

Witnesses:
ALVI T. BALDWIN,
NELLIE C. O'BRIEN.